Feb. 7, 1950
G. SIEMS
2,496,563
EXTENSION FOR MATERIAL HANDLING SCOOPS
Filed June 12, 1947
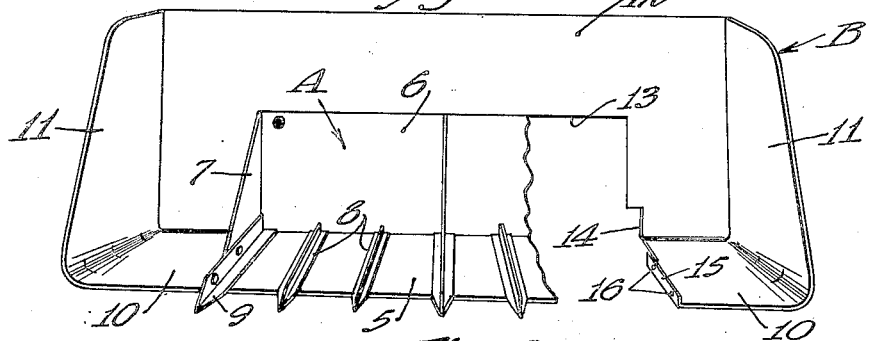
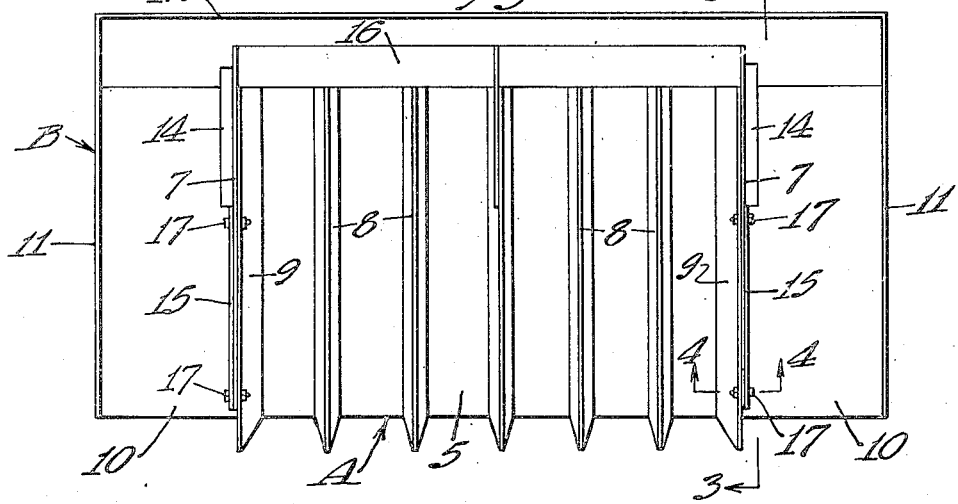
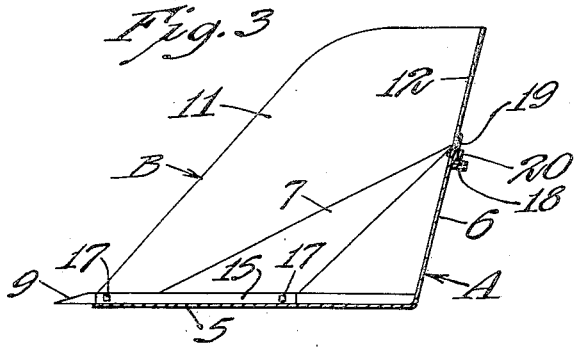
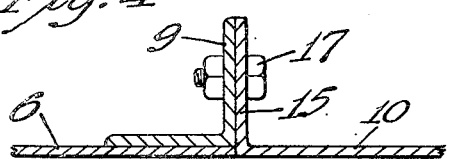
Inventor
George Siems
By Williamson & Williamson
Attorneys Patented Feb. 7, 1950

2,496,563

UNITED STATES PATENT OFFICE 2,496,563

EXTENSION FOR MATERIAL HANDLING SCOOPS

George Siems, Fairmont, Minn.

Application June 12, 1947, Serial No. 754,171

6 Claims. (Cl. 214—145)

This invention relates to an extension attachment for material handling scoops.

A number of material handling scoops have been designed and produced for mounting on vehicles such as farm tractors or the like, to pick up and carry or load various types of bulk material such as dirt and a number of different kinds of farm products. A number of these material handling scoops are adapted for attachment to the front end of a farm tractor and their capacity is usually relatively small. They are purposely made so because the equipment and the structure is not designed to lift large loads of heavy substances such as dirt and barnyard manure. Consequently they are relatively inefficient for handling loose bulky material of comparatively light weight such as ears of corn and hay or for snow removal.

It is an object of the present invention to provide an extension attachment for material handling scoops particularly of the type mentioned above, which will greatly enlarge the capacity of the implement so that it can be effectively and efficiently used for handling many types of relatively light weight bulky materials.

Another object of the invention is to provide an attachment for scoops which is simple in structure and which is used in conjunction with the material from which the original scoop is manufactured to produce the larger composite structure with a minimum of additional material.

A further object of the invention is to provide a scoop of the general type outlined above which is so constructed that it is sturdy, of relatively light weight and which can be quickly and easily attached to and removed from the conventional scoop.

The above and other objects and advantages of the invention will more fully appear from the following description made in connection with the accompanying drawings, wherein like reference characters refer to the same parts throughout the views, and, in which:

Figure 1 is a front perspective view of the device mounted on a conventional scoop, portions of the scoop being broken away;

Figure 2 is a plan view of the structure shown in Figure 1;

Figure 3 is a vertical sectional view therethrough, on the line 3—3 of Figure 2;

Figure 4 is an enlarged fragmentary sectional view taken approximately on the line 4—4 of Figure 2.

In the drawing there is shown a conventional material handling scoop structure including a sheet metal bottom 5, a back 6, end plates 7, and a plurality of longitudinally disposed teeth or tines 8 which are disposed in transversely spaced relation between the ends of the scoop bottom 5. At the ends are teeth or tines 9 which are formed of angle iron to serve the additional function of strengthening the corners of the bucket or scoop. The scoop indicated generally at A is adapted to be mounted on suitable boom elements which are connected to a tractor and adapted to be raised and lowered in a manner generally known in the art. The booms and the tractor operated elevating mechanism are not shown.

The structure of my invention includes a pair of laterally spaced sheet metal bottom portions 10, the metal of which they are formed being turned upwardly to provide upstanding side or end members 11. A back sheet 12 is suitably secured to the rear edges of the bottom portions 9 and side portions 11. While I prefer to form my attachment of sheet metal, it of course is conceivable that it could be made of some other suitable material in some continuous sheet form or of a more or less open construction. The back 12 is provided with a generally rectangular cut out 13 whose width is approximately the same as the distance between the laterally spaced bottom portions 10. At each side of the attachment generally designated at B there are rectangular cut outs 14 which are formed partially in the bottom portions 10 and partially in the back member 12.

The bottom portions 10 are provided at their inwardly disposed adjacent spaced edges with upturned flanges 15 having apertures 16 therein to receive suitable fasteners such as nutted bolts 17 shown in Figures 2, 3, and 4 and which also extend through the angle irons 9 which form the outer teeth and reinforcing members of the conventional scoop structure A. The lower edge of that portion of the back 12 of the attachment B which defines the top of the opening 13 in said back butts against the upper edge of the back 6 of the conventional scoop A. The scoop A has a rearwardly disposed and generally horizontal flange 18 welded thereon. Welded or otherwise secured to the back portion 12 of the attachment B is an angle iron 19 which is adapted to be connected by nutted bolts 20 to a portion of the conventional scoop A which extends above the flange 18 as shown in Figure 3.

The cut outs 14 in the bottom and back portions 10 and 12 respectively are provided to accommodate the forward ends of the scoop elevating booms mentioned above and not shown since they are not a part of the present structure.

The extension attachment B is one which, as is clearly illustrated, adds considerably to the capacity of the conventional scoop A. It is one which provides for greatly increased capacity with a minimum of additional material. The spaced bottom portions 10 of my structure and the cut out back 13 are adapted to inter-fit with the bottom and back of the conventional scoop A so that those latterly mentioned parts are utilized without requiring duplication of material beneath and in back of the conventional scoop A. Furthermore the structure just referred to is extremely light for its size by reason of the considerable amount of metal taken out because of the cut outs so that the attachment can be easily handled with a minimum of effort. It is a device which can be quickly and easily attached to a conventional scoop such as the device A and when so attached it receives considerable reinforcement from the structure of the conventional scoop itself.

A device such as that disclosed herein is extremely useful and practical for snow removal and for handling relatively light yet bulky materials such as ears of corns whether such products are loaded or otherwise handled in bulk. However for digging and loading heavy materials such as dirt, barnyard manure and the like, the attachments can be readily be removed and the conventional scoop used alone, since the average farm tractor cannot handle too great a load of a relatively dense material.

With reference to digging and removing snow from roadways, barnyards or the like, it will be noted that the attachment utilizes the strength and penetrating qualities of the teeth or tines 8 and 9 on the conventional scoop so that hard packed snow can be dug without damage to the extension structure. When so used the teeth 8 and 9 will break up the snow and prevent the imposing of too great a strain on the leading edges of the bottom and sides 10 and 11 of my attachment B.

It will, of course, be understood that various changes may be made in the form, details, arrangement and proportions of the various parts throughout the views without departing from the scope of my invention.

What I claim is:

1. An extension attachment for material handling scoops having bottom and back members, comprising an extension body having laterally spaced bottom portions defining an opening scoop receiving space between them and being arranged for attachment to the sides of said scoop, extension body side portions extending upwardly from the outer side edges of said bottom portions, and back structure connecting said bottom portions extending upwardly from rear of said bottom portions and arranged for attachment to the back of said scoop.

2. The structure in claim 1 and said back structure having a scoop back receiving opening therein.

3. The structure in claim 1 and said back portion having a scoop receiving opening therein and including an upper transverse portion extending above said scoop receiving opening.

4. An extension attachment for material handling scoops having bottom and back members, comprising a body having laterally spaced bottom portions defining a scoop receiving space between them, the adjacent side edges of said bottom portions having scoop attachment elements extending upwardly therefrom and adapted to be secured to side portions of said scoop, said attachment body having side portions extending upwardly from the outer side edges of said bottom portions and a back structure extending upwardly from the rear of said bottom portions and arranged for attachment to the back of said scoop.

5. An extension attachment for material handling scoops having bottom and back members, comprising a body having laterally spaced bottom portions defining a scoop receiving space between them, the adjacent spaced side edges of said body bottom portions having scoop attachment elements extending upwardly therefrom, body side portions extending upwardly from the outer side edges of said bottom portions, a back structure extending upwardly from the rear of said bottom portions, said back structure having a scoop back receiving opening therein and having an upper transverse portion extending across the upper side of said scoop receiving opening, and the lower edge of said upper transverse body back portion defining the top of said scoop receiving opening, having scoop attachment elements thereon.

6. An extension attachment for material handling scoops having bottom and back members, comprising a body having laterally spaced bottom portions and a back portion, said spaced bottom portions having an open scoop receiving area therebetween, said back portion being connected to said spaced bottom portions, said bottom and back portions including structure comprising scoop bottom and back engaging means, and said first mentioned bottom and back portions comprising extensions of said scoop bottom and back members lying in substantially the same planes as said scoop bottom and back members.

GEORGE SIEMS.

REFERENCES CITED

The following references are of record in the file of this patent:

UNITED STATES PATENTS

| Number | Name | Date |
|--------|------|------|
| 918,695 | Peterson | Apr. 20, 1909 |
| 2,190,164 | Seyller | Feb. 13, 1940 |
| 2,323,434 | Williams | July 6, 1943 |
| 2,441,070 | Hoover | May 4, 1948 |